United States Patent [19]

Oshier

[11] 4,014,088

[45] Mar. 29, 1977

[54] METHOD OF MAKING DECORATIVE ARTICLES

[76] Inventor: Jack A. Oshier, 36-16 Bell Blvd., Bayside, N.Y. 11361

[22] Filed: Jan. 27, 1976

[21] Appl. No.: 652,648

[52] U.S. Cl. .................................. 29/407; 29/428; 29/526; 113/116 Z; 428/24

[51] Int. Cl.² .......................................... B23Q 17/00

[58] Field of Search ............ 29/403, 428, 407, 526; 428/24, 18, 7; 113/116 Z

[56] References Cited

UNITED STATES PATENTS

| | | | |
|---|---|---|---|
| 1,307,617 | 6/1919 | Burrows | 428/24 |
| 1,554,524 | 9/1925 | Rhoads | 428/24 X |
| 1,731,089 | 10/1929 | Adams | 29/428 |
| 1,914,591 | 6/1933 | Abe | 428/24 X |
| 2,514,177 | 7/1950 | Brown | 29/428 X |
| 2,561,217 | 7/1951 | Muir | 428/24 X |
| 2,639,533 | 5/1953 | Casals | 29/428 |
| 2,692,449 | 10/1954 | Jones | 428/24 |
| 2,736,116 | 2/1956 | Cummings | 428/7 |
| 2,881,545 | 4/1959 | Decamp | 29/428 X |
| 3,481,463 | 12/1969 | Pavlow | 428/24 X |

*Primary Examiner*—Charlie T. Moon
*Attorney, Agent, or Firm*—Darby & Darby

[57] ABSTRACT

In making useful and decorative articles such as Christmas tree ornaments, ash trays, candle holders, napkin holders, artificial flowers, toys and the like from aluminum cans, first the top or bottom portion of the can is cut off, then a predetermined number of holes of predetermined size and spacing are punched about the outer wall of the can, then the outer wall of the can is cut between the holes in order to form a predetermined number of strips of uniform width, the cut strips are bent to an arcuate shape and fastened together and/or, depending on the article being made, fastened to either the end wall or side wall of the can. In making certain articles, the top or bottom portion of a second can is cut off, then the outer wall of the can is marked and cut into strips and the strips are fastened together. The first can may be fastened to the second can.

In making such articles, a strip of foldable paperboard with markings of a predetermined number and spacing imprinted there-on is wrapped around the can and used as a guide for the marking and punching operations described above.

6 Claims, 15 Drawing Figures

METHOD OF MAKING DECORATIVE ARTICLES

BACKGROUND OF THE INVENTION

This invention generally relates to a method and apparatus for making decorative articles such as Christmas tree ornaments, ash trays, candle holders, napkin holders, artificial flowers, toys and the like from empty aluminum and more particularly aluminum beverage cans.

In recent years, beverages such as soda and beer have been packaged in aluminum cans with flip-top opening devices. For ecological reasons, attempts have been made to recycle empty beverage cans. These attempts have met with only limited success.

This invention permits the use of empty aluminum cans, and particularly aluminum beverage cans, to manufacture useful and decorative articles such as candle holders, napkin holders, coasters, ash trays, Christmas tree ornaments, planters, toys, lamps, centerpieces, artificial flower arrangements and the like in a simple and inexpensive fashion.

SUMMARY OF THE INVENTION

Briefly, the method of the present invention involves making useful and decorative articles by first cutting off the top or bottom portion of an empty aluminum can. Then, a foldable paperboard guide approximately the same length as the diameter of the aluminum can is wrapped about the outer wall of the can directly adjacent the cut edge of the can and fastened to the can by any suitable means such as adhesive tape. The guide is imprinted with a series of markings of predetermined number and spacing. A paper punch is positioned over each of the markings on the guide and a series of holes is punched through the guide and the can. Then, the can is cut lengthwise between the holes to form a predetermined number of strips of uniform width. The cut strips are then bent to an arcuate shape and either fastened together or fastened to the side wall or the remaining end wall of the can depending on the particular article being manufactured.

In making certain articles, the top or bottom portion of a second aluminum can is cut off and the punched guide is wrapped about the outer wall of the can adjacent the cut edge of the can and fastened by any suitable means. The outer wall of the can is then marked through each of the holes in the guide and the outer wall of the can is cut lengthwise between the markings as described above to form a predetermined number of strips of uniform width. The ends of the cut strips may be fastened together to form decorative cusps and the first can may be nested within and fastened to the second can so as to provide a decorative background for the useful article.

The more complicated and ornate articles which are made by this method may utilize various variations and combinations of the basic steps outlined above. Additional features of the apparatus used in practicing the method of this invention and the complete nature of the method of this invention will become apparent following a consideration of the ensuing specification and the appended claims in which the invention is defined, particularly when taken in conjunction with the accompanying illustrative drawings setting forth a preferred embodiment of the invention.

DESCRIPTION OF PREFERRED METHOD AND APPARATUS

In describing the preferred method and apparatus of this invention, reference will be made to aluminum beverage cans which have a top and bottom wall interconnected by a cylindrical wall approximately eight and three-sixteenths inches in diameter. However, it should be understood that other size and shape aluminum cans could be used in practicing the method of this invention. Of course, the use of different size and shape cans from the beverage cans described here would require obvious modifications in the apparatus used in practicing the invention.

Figure 1:
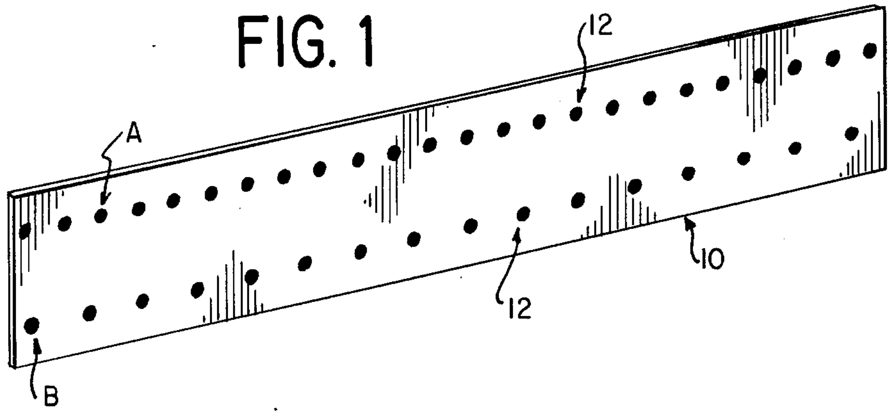
FIG. 1 is a perspective view of the foldable paperboard guide used in practicing the method of this invention.

Referring to FIG. 1, the punching and marking guide 10 which is used in practicing the preferred method of this invention is illustrated. The guide 10 is preferably composed of foldable paperboard approximately one and one-half inches wide and eight and five-sixteenths inches long. There are two rows of markings or dots 12 imprinted on the guide 10. Each of the dots 12 marked on the guide 10 is approximately one eighth of an inch in diameter. One of the rows A of dots 12 consists of twenty-four dots spaced approximately a quarter of an inch apart. The other row of dots B on the guide 10 consists of sixteen dots, each dot being approximately an eighth of an inch in diameter and being spaced apart approximately three eighths of an inch. The rows of dots A and B on the guide 10 permit the making of 24 and 16 strips respectively in the can as described in more detail below.

Figure 2:
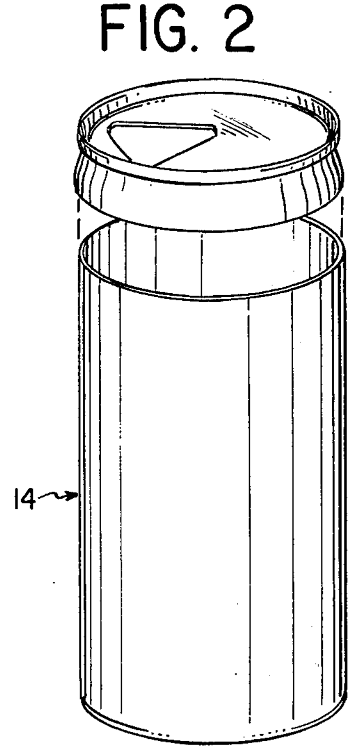
FIG. 2 is a perspective view of an aluminum beverage can with the top portion cut off.

In making a candle holder according to the method of this invention, a standard size aluminum beverage can 14 which has a cylindrical wall approximately eight and three-sixteenths inches in diameter and two end walls is used. The first step in making the candle holder illustrated in FIG. 14 involves cutting the top portion of the can off, as illustrated in FIG. 2. This is easily accomplished by punching a hole in the can with a pair of curved scissors and cutting around the circumference of the can.

Figure 3:
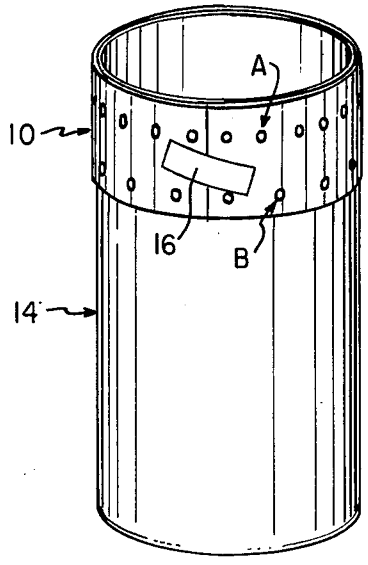
FIG. 3 is a perspective view of an aluminum beverage can with the paperboard guide fastened adjacent the cut edge.

Referring now to FIG. 3, the punching and marking guide 10 illustrated in FIG. 1 is wrapped around the cylindrical wall of the can adjacent the cut edge. The ends of the guide 10 are fastened together by any suitable means such as a piece of tape 16. Any other suitable fastening device such as a rubber band or any other type of fastener may be used.

Prior to affixing the marking and punching guide 10 to the can as illustrated in FIG. 3, holes should be punched in the guide with a standard ⅛ inch paper punch such as the GEM paper punch manufactured by McGill Metal Products Company, Marengo, Illinois.

Referring again to FIG. 3, a scribe or other marking instrument is used to mark the can through the row of holes A on the marking guide.

Figure 4:
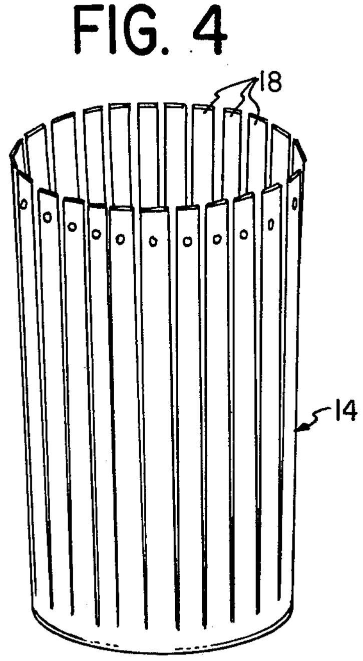
FIG. 4 is a perspective view of an aluminum can cut into strips.

Referring now to FIG. 4, the next step involves cutting the cylindrical wall of can 14 lengthwise between the marks on the can. The can should be cut along its entire length so as to form 24 strips 18.

Figure 5:
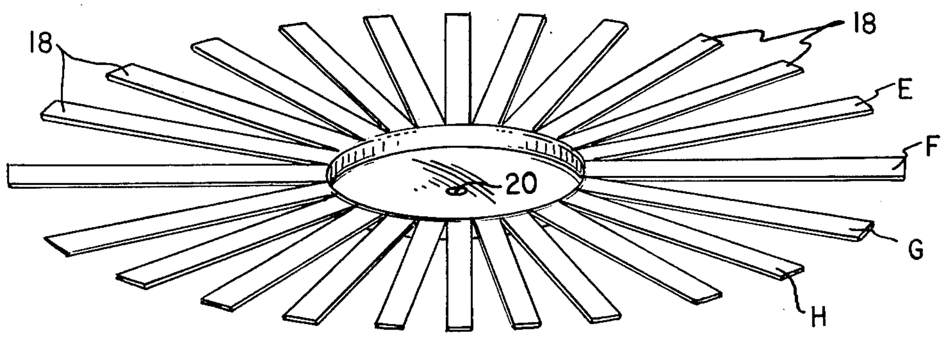
FIG. 5 is a perspective view of an aluminum can with the strips folded in a horizontal direction.

Referring now to FIG. 5, the strips 18 are flattened out so that they extend in a substantially horizontal plane. Also, a hole 20 is punched in the bottom wall of the can 14.

Figure 6:
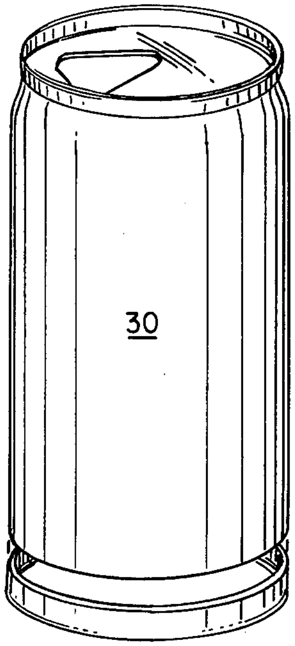
FIG. 6 is a perspective view of a second aluminum can with the bottom portion being cut off.
Figure 7:
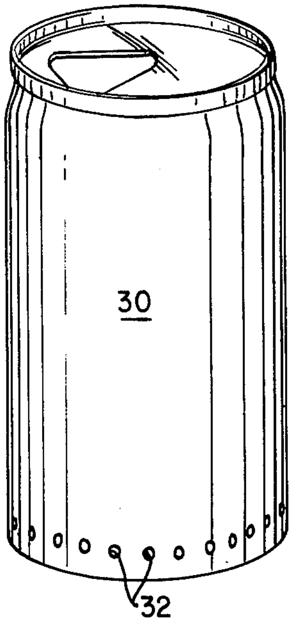
FIG. 7 is a perspective view of the second aluminum can with holes punched about the outer wall of the can.

The next series of steps in the method of making a candle holder according to this invention steps which can be used to make other articles, as described below. These steps involve taking another aluminum beverage can 30 and cutting off the bottom of the can as illustrated in FIG. 6. The marking and punching guide 10 is fastened about the cylindrical wall of the bottom portion of the can 30 in the same manner as the guide 10 was fastened about the top portion of can 14. Then, a standard ⅛ inch paper punch is used to punch holes in the cylindrical wall of the bottom portion of the can through the row of holes A in the marking and punching guide 10. This step is slightly different from the step undertaken with respect to can 14 where the marking and punching guide 10 was used solely to mark the can. Here, the marking and punching guide is used to properly position the punched holes in the cylindrical wall of the can, as best illustrated in FIG. 7.

It is desirable to perform the series of steps described in the preceding paragraph with respect to can 30 before the series of steps described above with respect to can 14 in order to eliminate the necessity of punching holes in the marking and punching guide 10 which can be done when the holes are punched in the aluminum can 30.

Figure 8:
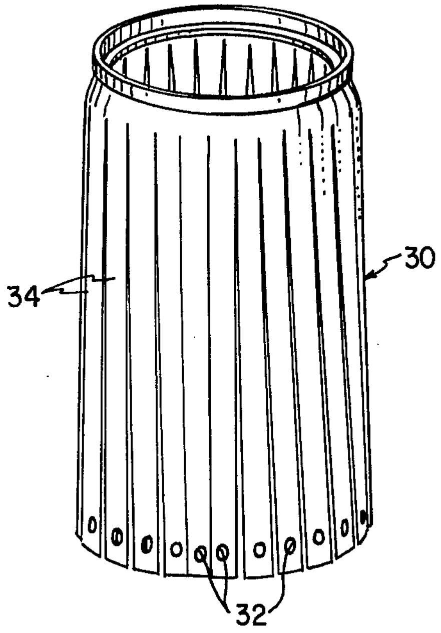
FIG. 8 is a perspective view of the second can having strips formed thereon.

Referring to FIG. 8, the next step in the method of this invention involves cutting the cylindrical wall of the aluminum can 30 between the punched holes 32 in order to form strips 34. The strips 34 are cut along the length of the can so that approximately 24 strips of uniform width are formed.

The series of steps described above with respect to can 30 also are used in the making of Christmas tree ornaments, napkin holders, ash trays, artificial flowers and other similar articles. The making of these articles is described generally below with reference to my copending design patent applications which illustrate these articles. In making these articles and the candle holder described here, there are also involved the steps of bending the cut strips 34 into an arcuate shape and fastening the strips together. In some instances, the fastened-together strips are fastened to the remaining end wall of the can or to the cylindrical wall, as described in more detail below.

Referred again to FIG. 8, the top end wall of the can 30 is removed in order to permit can 30 to be nested within can 14. Many beverage cans such as can 14 have an inwardly rounded bottom end wall. When using cans of this type, it is necessary to cut out the top end wall of can 30 so that can 30 nests within can 14. This can be accomplished by using a small curved scissors. One end of the scissors is punched into the top end wall of the aluminum can and it is merely necessary to cut around the top of the can to remove the top end wall. Certain types of beverage cans, unlike can 14, have flat bottom end walls. If such cans are used in place of can 14, then it is not necessary to remove the top end wall of can 30 in order to permit can 30 to nest within such cans.

Figure 9:
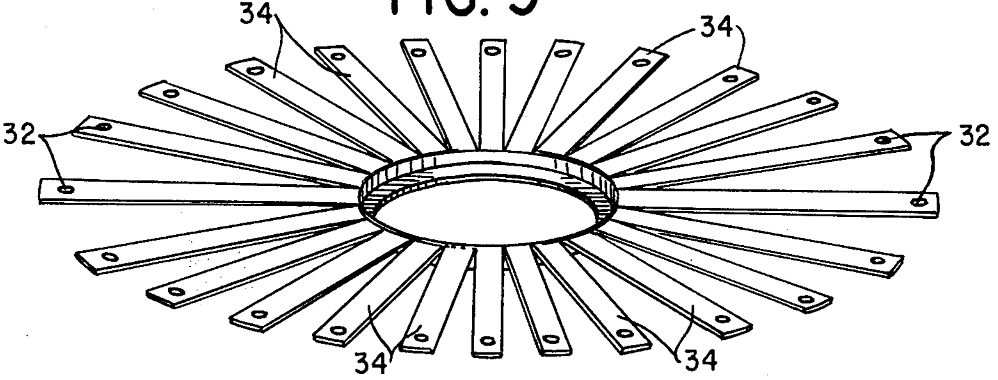
FIG. 9 is a perspective view of the can of FIG. 6 with the strips being folded to a horizontal plane.

Referring now to FIG. 9, the strips 34 are then flattened out to a generally horizontal position.

Figure 10:
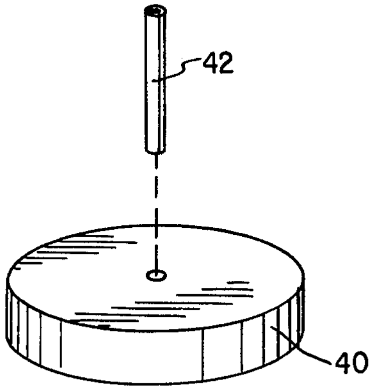
FIG. 10 is a perspective view of a cylindrical base and tube which may be used in practicing the method of this invention.

In assembling the candle holder of this invention, it is helpful to use the device illustrated in FIG. 10 which consists of a base 40 within which is placed a tube 42 supported within the base which is approximately one eighth of an inch in diameter. The use of this device is explained in more detail below.

Figure 11:
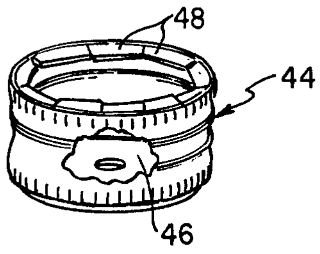
FIG. 11 is a perspective view of a bottle cap with crimped side edges and a hole being punched therein.

Referring to FIG. 11, an ordinary twist-off bottle cap 44 is illustrated in which a hole has been punched in the top wall 46. Also, the side edges 48 of the bottle cap has been crimped over. This can easily be accomplished by engaging the side walls of the cap with a pair of long-nose pliers and crimping the side edges over.

Figure 12:
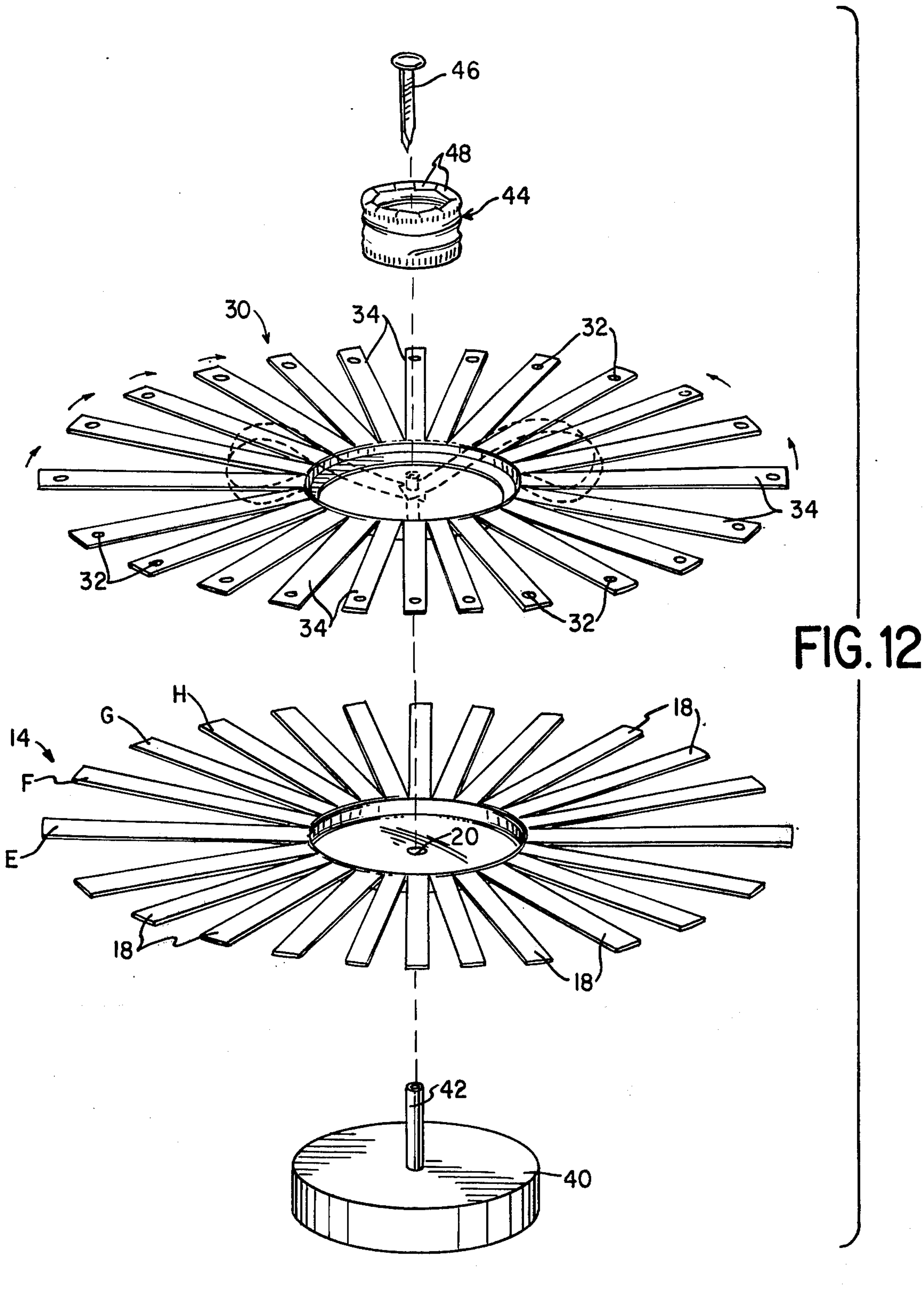
FIG. 12 is an exploded view of the first and second cans being assembled into a candle holder.

Referring to FIG. 12, an exploded view of the method of assembly of the candle holder is illustrated. First, the can 14 in which a hole 20 has been punched in the bottom wall is placed over the tube 42 so that the bottom wall of the can 14 rests on the circular base 40. Then, the can 30 is nested within can 14. As previously mentioned, it may be necessary to cut out the top wall of the can 30 because some aluminum beverage cans have inwardly curved bottom walls which would prevent proper nesting of can 30 within can 14.

The next step involves folding each of the strips 34 of can 30 onto the tube 42 through the hole 32. Since the aluminum strips are relatively pliable and resilient, they readily fold over onto the tube 42 and form an arcuate curve. In folding the strips 34 onto the tube 42, it is preferred that oppositely facing strips be folded over the tube 42 directly after one another. Thus, if the first strip folded over the tube 42 is strip C, the next strip which should then be folded over the tube 42 would be oppositely positioned strip D.

Figure 13:
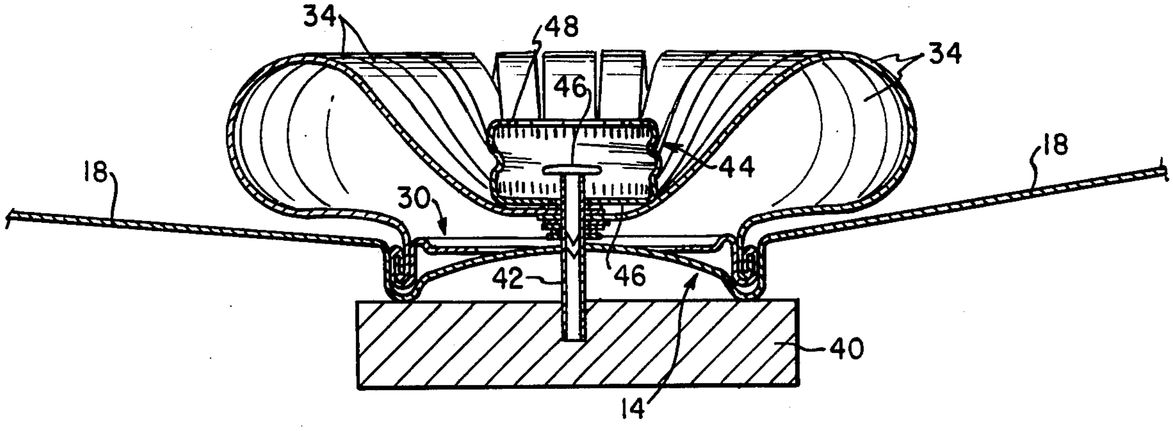
FIG. 13 is a view of the first and second cans illustrated in FIG. 12 partially assembled into a candle holder.

Referring now to FIG. 13, after all of the strips 34 have been folded over the tube 42, the bottle cap illustrated in FIG. 11 is placed over the tube 42 so that the hole in the bottom of the bottle cap engages the tube 42.

Then a standard paper fastener 46, which is approximately ⅛ of an inch wide and six eighths of an inch to an inch long, is placed inside the tube 42 which projects outwardly from the top of the bottle cap. The tube 42 is then removed from the paper fastener 46 so that the paper fastener 46 then extends through the bottle cap 40, the holes in strips 34 of can 30 and the bottom wall of can 14. The free legs of the paper fastener are crimped beneath the bottom wall of the can 14 so that the paper fastener securely maintains the entire structure together. Of course, any other suitable fastener such as a rivet or nut and bolt or wire may be used. In some instances, it may be possible to eliminate the tube 42 and base 40 in fastening the various elements of the candle holder together. For example, the paper fastener may be placed first through the hole in the bottom wall of can 14, then through the holes in the cut strips 34 of can 30, then through the hole in the top wall of the inverted bottle cap and then the free legs of the fastener may be crimped. Although this achieves the desired result of securely maintaining the various elements of the candle holder together, it is not desirable because the crimped legs of the paper fastener do not present a flat surface to the candle to be inserted into the bottle cap top.

Figure 15:
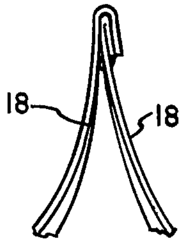
FIG. 15 is a detail of the fastening of the strips in the first aluminum can according to the method of this invention.
Figure 14:
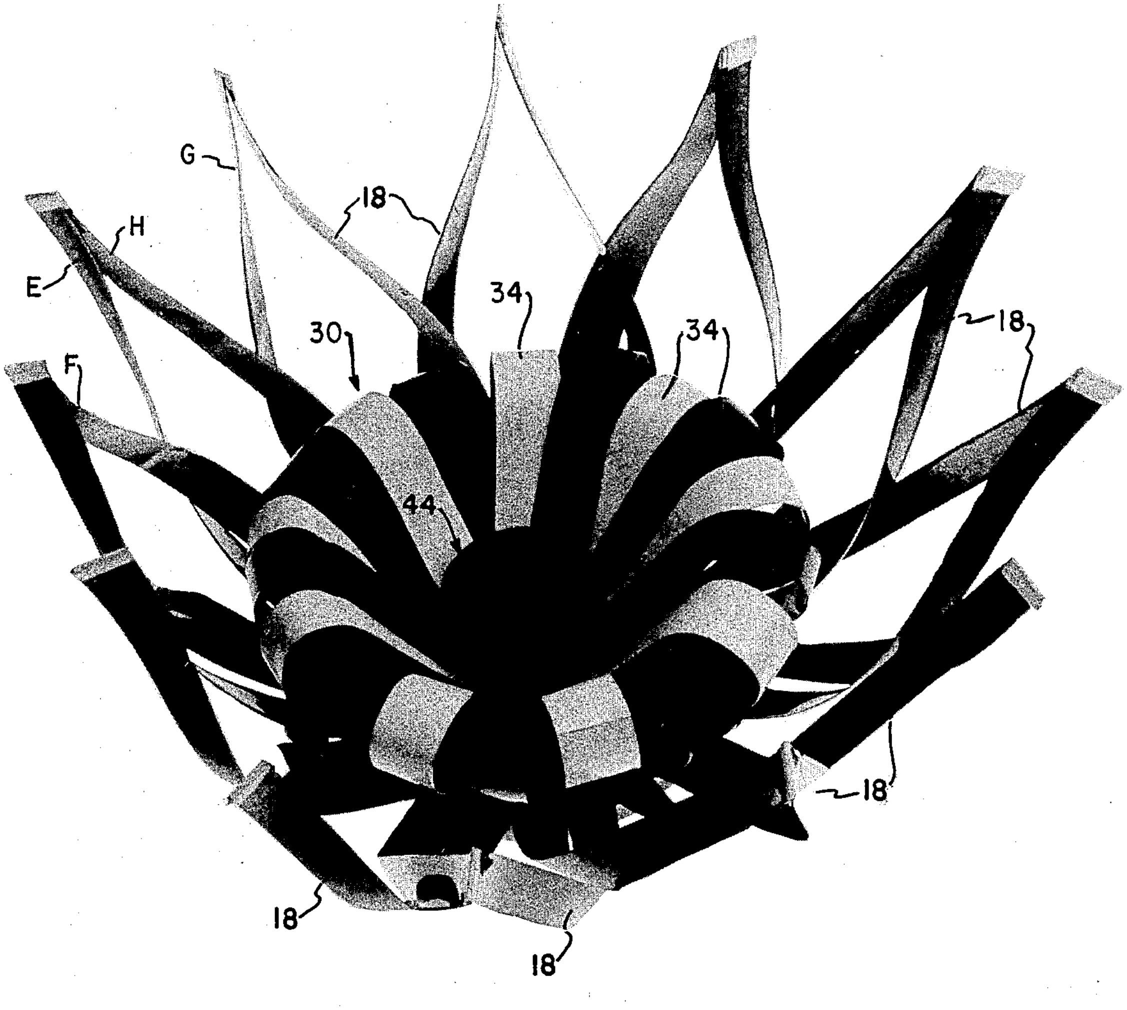
FIG. 14 is a perspective view of the candle holder made according to this invention.

After all of the elements of the candle holder are fastened together as illustrated in FIG. 13, the cut strips 18 of can 14 may be fastened together to form decorative cusps. This is accomplished by lapping a first cut strip 18 beneath an adjoining strip and joining it to the strip two away which is lapped over the strip adjoining it. Referring to FIGS. 12 and 14, strip E is lapped over strip F and the end of strip E is fastened to the end of strip H which is lapped over strip G so as to provide the effect illustrated in FIG. 14. Any suitable means may be used to fasten the ends of strips together such as crimping the ends of fastened strips as illustrated in FIG. 15. Also, the strip ends could be fastened together by paint or another adhesive.

METHOD OF MAKING CHRISTMAS TREE ORNAMENT

My copending U.S. design Pat. application Ser. No. 652,880, filed Jan. 27, 1976 for Christmas Tree Ornament which is hereby incorporated into this application, discloses in FIGS. 1–16 four embodiments of Christmas tree ornaments made according to the method of this invention. In making these ornaments, the top portion of an aluminum can is cut off, a guide is wrapped about the can directly adjacent the cut edge, holes are punched through the guide and the cylindrical wall of the can, and the cylindrical wall of the can is cut into strips between the holes. In the first embodiment illustrated in FIGS. 1–4, a guide which forms twenty-four strips is used and pinking shears are used to cut the strips. In the second embodiment illustrated in FIGS. 5–8, a guide which forms twelve strips is used.

The strips in the first four embodiments illustrated in FIGS. 1–16 are then flattened to a substantially horizontal plane, then bent to form an arcuate shape and finally fastened together with a paper fastener through the holes which were punched in the strips.

FIGS. 17–20 of my copending design application illustrate yet another embodiment in which alternating strips are fastened together as described in the preceding paragraph and the remaining strips are fastened to the bottom of the can.

FIGS. 21–24 of my copending design application illustrate yet another embodiment in which alternating strips are fastened together as described above with respect to FIGS. 1–16 and the remaining strips are bent in the opposite direction in an arcuate fashion and fastened together.

METHOD OF MAKING ASH TRAY, COASTER

My copending U.S. design Pat. application Ser. No. 652,651, filed Jan. 27, 1976 for ash tray, coaster, candle holder, pin cushion, or similar article which is hereby incorporated into this application, discloses in FIGS. 1–16 four embodiments of all the articles designated in the title which are made according to the method of this invention.

In making the ash tray illustrated in FIGS. 1–4 of my design application, the top portion of an aluminum can is cut off, a guide is wrapped about the can directly adjacent the cut edge, holes are punched through the guide and the cylindrical wall of the can and the cylindrical wall of the can is cut into strips between the holes. In making the ash tray, the can is not cut along its entire length so that a cylindrical well is formed. The cut strips are then bent to a substantially horizontal plane and then bent into an arcuate curve and fastened together to the underside of the bottom wall of the can. The top portion of a second can is cut off so that only a cylindrical well approximately a quarter of an inch deep remains. The first can is nested within the second can and attached to it by means of the fastener which secures the cut strips to the bottom wall of the first can.

The other articles disclosed in this design application are made in the same manner.

METHOD OF MAKING NAPKIN HOLDER

My copending U.S. design Pat. application Ser. No. 652,650, filed Jan. 27, 1976 for Napkin Holder which is hereby incorporated into this application, discloses in FIGS. 1–5 a napkin holder made according to the method of this invention. In making the napkin holder, strips are cut into a first can as described above and the strips are fastened together to the bottom wall of the can. Strips are also formed in a second can and, as illustrated in FIGS. 1 and 2 of my design application, certain of the strips of the first can are fastened together to form shell-like receptacles for the napkins and the remaining strips are cut and fastened to the bottom wall of the second can. The second can is then nested within the first can and attached to it by means of a fastener which extends through the horizontally oriented cut strips on the second can, the bottom wall of the second can, the ends of the arcuately shaped cut strips of the first can and the bottom wall of the first can.

METHOD OF MAKING ARTIFICIAL FLOWER ARRANGEMENT

My copending U.S. Pat. application Ser. No. 652,652, filed Jan. 27, 1976 for Artificial Flower Arrangement which is hereby incorporated into this application, discloses in FIGS. 1–12 two embodiments of artificial flower arrangements made according to the method of this invention. In making the flower arrangements illustrated in FIGS. 1–6, the individual flowers are made in the same manner as the second can 30 described in this utility patent application and illustrated in FIGS. 13 and 14 except that no bottle cap 44 is used.

The holder for the flowers is made in the same manner and is positioned within yet another can, the top portion of which has been cut off. FIGS. 13–18 of my copending design application illustrate a third embodiment in which the holder for the artificial flowers illustrated in FIGS. 1-12 is nested within a third can. The strips of this third can are formed in the same manner as in the second can 30 described in this utility application. Certain of the cut strips of this third can are formed into shell-like receptacles, as in the Napkin Holder case referred to above, and are fastened to the side wall of the second can. A paper fastener extends through holes punched in the bottom walls of the second and third cans to hold the cans together.

Referring to FIGS. 7-12, the flowers in the second embodiment of the artificial flower arrangement illustrated in my design application is made by fastening alternating strips of the can to alternating sides of the bottom wall of the can.

METHOD OF MAKING PLANTER

My copending U.S. design Pat. application Ser. No. 652,654, filed Jan. 27, 1976 for Planter or Similar Article which is hereby incorporated into this application, discloses in FIGS. 1-5 a planter made according to the method of this invention. In making this planter, the wheels of the planter are made in the same fashion as described above with respect to the second can 30 of the present utility application and which is illustrated in FIGS. 13 and 14 of the present utility application.

The wheels of the planter are attached to the cylindrical walls of second and third cans which are attached together as illustrated in FIG. 1 of my design application.

METHOD OF MAKING TOY CANNON

My copending U.S. design Pat. application Ser. No. 652,653, filed Jan. 27, 1976 for Toy Cannon which is hereby incorporated into this application, discloses in FIGS. 1 and 6 a toy cannon made according to the method of this invention. In making the toy cannon, the wheels of the cannon are made in the same manner described in this application with respect to can 30 which is illustrated in FIGS. 13 and 14. As illustrated in FIGS. 1 and 2 of my design application, the wheels of the cannon are fastened to the cylindrical wall of a second can.

METHOD OF MAKING CANDLE HOLDER

My copending U.S. design Pat. application Ser. No. 652,649, filed Jan. 27, 1976 for Candle Holder or Similar Article which is hereby incorporated into this application, discloses in FIGS. 1-36 nine embodiments of candle holders made according to the method of this invention.

The nine embodiments disclosed in my copending design application all utilize variations of the various methods of the basic techniques described above with respect to making candle holders and the various other articles described above.

It is conceivable upon examining the foregoing disclosure, those skilled in the art may devise embodiments of the concepts involved which differ somewhat from the embodiments shown and described herein or may make various changes in details in the present embodiments. Consequently, all such changed embodiments or variations in structure which utilize the concepts of the invention and clearly incorporate the spirit thereof are to be considered within the scope of the claims appended below.

What is claimed is:

1. A method of making decorative articles such as Christmas tree ornaments, napkin holders, candle holders, artificial flowers, coasters, ash trays, centerpieces and the like from aluminum cans having a pair of end walls interconnected by a cylindrical wall, comprising the steps of cutting off the top or bottom portion of a first can, punching a series of holes of predetermined number and spacing in the outer surface of the first can cylindrical wall adjacent to the cut edge of the can, cutting the cylindrical wall of the first can between the punched holes along the length of the can from the cut edge such that a predetermined number of strips of a predetermined size foldably connected to the remaining portion of the first can are formed, bending the cut strips into an arcuate shape, and fastening the cut strips together by means of a fastener extending through the punched holes in each of the cut strips.

2. The method recited in claim 1, further comprising the steps of punching a hole in the remaining end wall of the first can and fastening the cut strips of the first can to the remaining end wall of the first can by means of a fastener extending through the punched holes in each of the cut strips and the hole in the remaining end wall of the first can.

3. The method recited in claim 1, further comprising the steps of cutting off the top or bottom portion of a second can, punching a hole in the cylindrical wall of the second can, nesting the second can within the first can and fastening the cut strips of the first can to the cylindrical wall of the second can by means of a fastener extending through the punched holes in the first can cut strips and the second can cylindrical wall.

4. The method recited in claim 1, further comprising the steps of cutting off the top or bottom portion of a second can, making a series of marks of predetermined number and spacing on the outer surface of the second cylindrical wall adjacent to the cut edge of the can, cutting the cylindrical wall of the first can between the marks along the length of the can from the cut edge of the second can such that a predetermined number of strips foldably connected to the remaining portion of the second can are formed, bending the cut strips of the second can such that the second can cut strips extend in a generally horizontal direction, fastening the ends of predetermined pairs of the second can cut strips such that the fastened-together pairs of cut strips form a cusp.

5. The method recited in claim 4, further comprising the steps of nesting the first can remaining portion within the second can remaining portion, punching a hole in the remaining end wall of the second can, and fastening the arcuately bent strips of the first can to the cusped strips of the second can by means of a fastener extending through the punched holes in each of the cut strips and the hole in the remaining end wall of the second can.

6. The method recited in claim 1, wherein the step of bending the cut strips into an arcuate shape includes the steps of bending certain of the cut strips over the remaining end wall of the first can and bending others of the cut strips below the remaining end wall of the first can.

* * * * *